March 9, 1926.

K. LIGNIEZ 1,576,240

AUTOMATIC INLET VALVE MECHANISM FOR RECIPROCATING ENGINES

Filed Sept. 12, 1923 2 Sheets-Sheet 1

INVENTOR
Kurt Ligniez
BY
Hauff Harland
ATTORNEYS

March 9, 1926.  
K. LIGNIEZ  
1,576,240  
AUTOMATIC INLET VALVE MECHANISM FOR RECIPROCATING ENGINES  
Filed Sept. 12, 1923  2 Sheets-Sheet 2
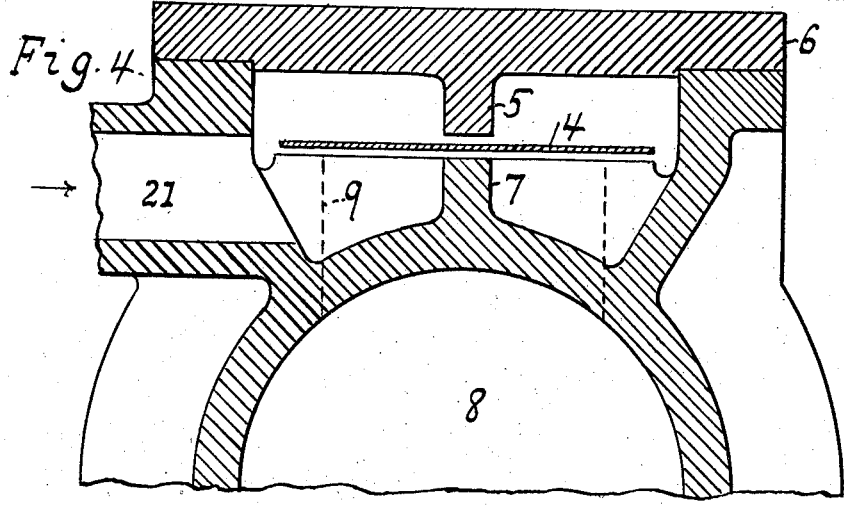
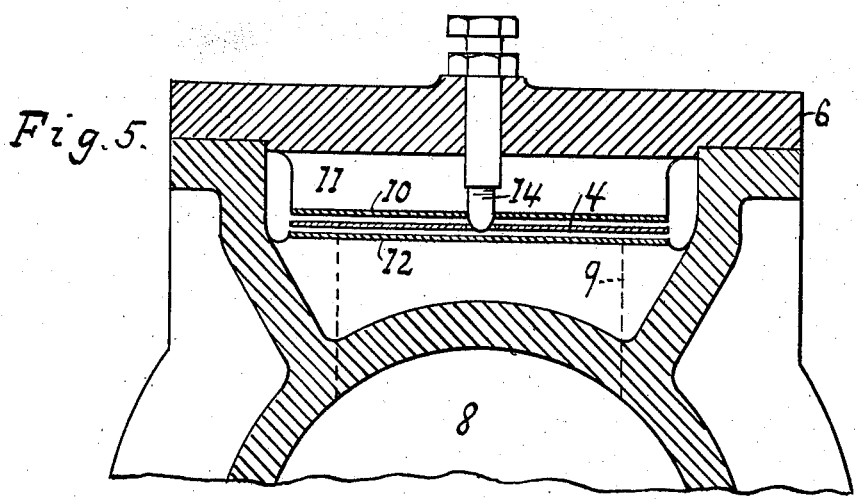
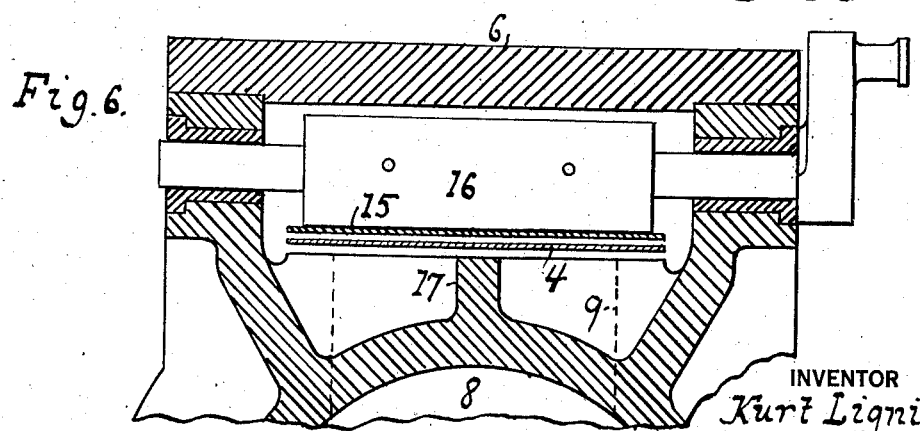
INVENTOR  
*Kurt Ligniez*  
BY  
ATTORNEYS Patented Mar. 9, 1926.

1,576,240

UNITED STATES PATENT OFFICE.

KURT LIGNIEZ, OF MANNHEIM, GERMANY.

AUTOMATIC INLET-VALVE MECHANISM FOR RECIPROCATING ENGINES.

Application filed September 12, 1923. Serial No. 662,333.

*To all whom it may concern:*

Be it known that I, KURT LIGNIEZ, a citizen of the German Empire, residing at Mannheim, Badenia, Germany, have invented new and useful Improvements in Automatic Inlet-Valve Mechanism for Reciprocating Engines, of which the following is a specification.

This application has been patented in Germany, Serial No. L58215 I/14 f, filed July 1, 1923, Patent No. 399,826 issued July 30, 1924.

This invention relates to an inlet valve mechanism for reciprocating engines in which the cut-off member is actuated to close the inlet by throttling the working vapor and which consists of a spring plate whose normal position allows the inlet port to remain open.

In all known spring valve mechanisms the moving member, during the action of opening or closing, strikes the lower or upper seat an appreciable blow, caused by the energy of the spring when opening and by the pressure on the spring when closing. The severe impact caused by the action of both of these forces not only produces noisy operation of the mechanism but also shortens the life of the spring, so that it breaks quickly. These two disadvantages were heretofore the chief obstacle for the adoption of a spring valve mechanism, although it is otherwise distinguished by its extreme simplicity.

An object of the present invention is to cushion the movement of the spring plate in both directions by the use of specially designed upper and lower seats in which the surface of the upper seat coincides with the line of deformation of the spring plate subjected to its open position, while the surface of the lower seat corresponds with the line of deformation of the plate in its closed position.

Because of the special shape of the seats, the spring plate in its open and closed position makes contact along the entire length of the seat. A considerable volume of steam remains trapped between the surface of the spring plate seats, especially when these are built wide enough. This steam must be displaced before contact of the spring plate and the seats is possible, thus creating a cushioning effect across the entire surface of the seat, which grows more effective as the number of spring strokes per minute increases.

The invention is more fully described in the following specification and claims, and illustrated in the accompanying drawing in which:—

Fig. 4 is a vertical transverse section taken along the line 4 4 of Fig. 1.

Fig. 5 is a similar section taken along the line 5 5 of Fig. 2.

Fig. 6 is a similar section taken along the line 6 6 of Fig. 3.

For the sake of clearness the spring plate 4 is shown in all its views in its mid-position between both stops.

Figure 1:
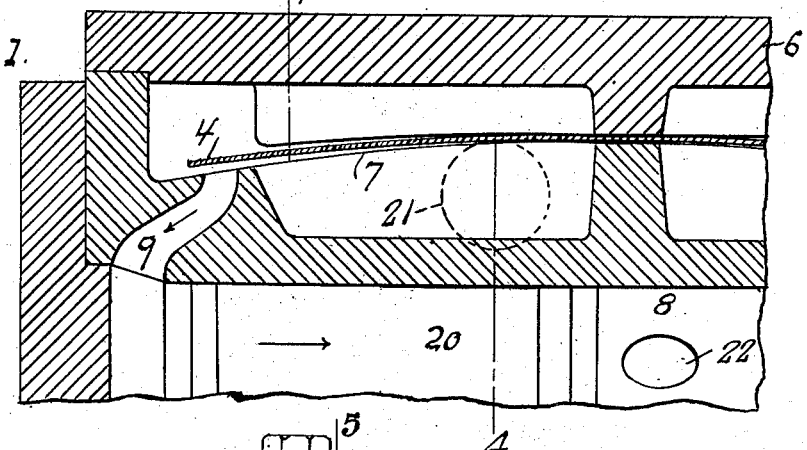
Fig. 1 represents a longitudinal section through the upper rear end part of a double acting cylinder of a horizontal steam engine.

Fig. 1 shows the upper seat 5 as a longitudinal rib of the cover 6 and the lower seat 7 as a longitudinal rib of the wall of a cylinder 8. Steam entering at 21 from below the cut-off spring has access to the inner edge of the inlet port 9 at both sides of the lower rib.

Figure 2:
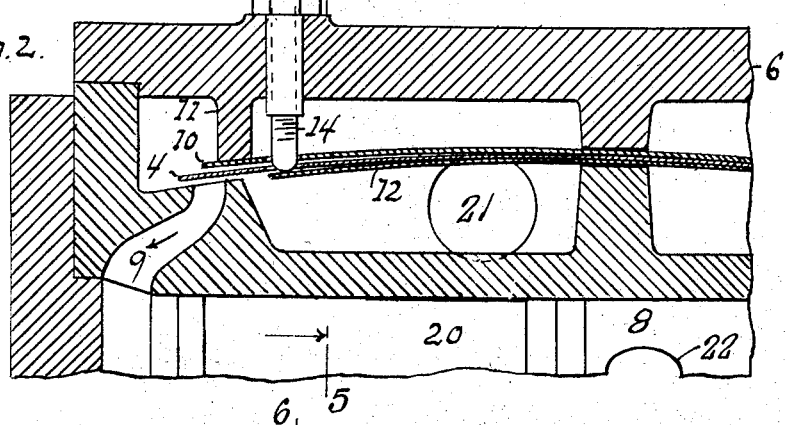
Fig. 2 is a similar view of a modification.

Fig. 2 shows the upper seat 10 as a spring plate held in tension by an upper rib 11 of the cover. The lower seat 12 is shown as a somewhat shorter spring plate which forms a gap between the inlet port 9 and the end of the plate so as to permit the steam to enter the port when open. The lower seat is held in tension in similar way by one or more screws 14 in the cover which pass through apertures in both upper spring plates. The lower seat by means of the screws can be adjusted so high that its extension would remain above the inlet port, the steam pressure then finally has to overcome the additional spring force of the lower seat.

Figure 3:
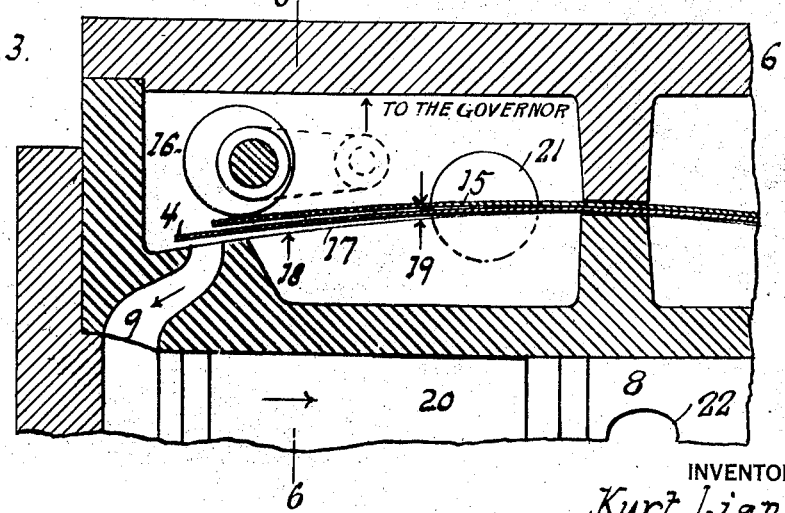
Fig. 3 is a similar view of another modification.

Fig. 3 represents the upper seat 15 as a spring plate whose tension is adjusted by an eccentric 16 controlled by a governor not shown. This arrangement varies the lift of the cut-off spring according to a longer or shorter cut-off. The lower seat 17 again as in Fig. 1 is represented by a rib. The increased curvature of the path of rolling contact as compared with the line of deformation of the spring plate begins at arrow 18 and has its maximum in the center of the path of rolling contact at the arrows 19.

When the inlet valve mechanism is in operation, steam enters through the gap of spring 4, and the port 9 into the steam cylinder 8 and moves the piston 20 ahead. At the return stroke of the piston the steam in the cylinder can be exhausted by means of a port 22 as indicated in Fig. 1. The velocity of the steam entering port 9 increases with the piston speed until an excess of steam pressure on the spring end is created, large enough to overcome the spring tension and to press spring 4 on the lower seat, thus closing the port. The length of the cut-off depends on the height of the spring gap above the inlet seat, on the speed of the engine and on the spring tension of the cut-off plate. The height of the gap can be adjusted as shown in Fig. 3 by the eccentric under the control of the governor or by the set-screw shown in Fig. 2.

It will be understood that the cut-off spring is opened by the pressure of compression of the steam. It should on dead center, just reach the pressure of the live steam, the spring then by its elastic force moves towards the upper seat.

It is further possible to increase the cushioning action by increasing the radius of curvature of the lower seat and conversely, decreasing the radius of curvature of the upper seat, as compared to the radii required by their respective lines of deformation.

Pure instantaneous seating contact of the spring plate then becomes gradual rolling contact. With this type of motion the particles of steam at the end of the spring plate do not make simultaneous contact with their seat, the contact rather begins at the fixed portion of the plate and then gradually extends to the free end of the rolling surface.

The inertia effect, with this type of seat, is dampened more effectively than with the type of seat corresponding to the line of deformation. Since the especially curved forms of the upper and lower seats should conform with the line of deformation of the spring valve plates under initial and final tension the simplest solution is to make the seats out of spring plates, which are subject to pressure at their ends by means of bolts or set-screws similar to the manner in which the cut-off member or spring plate is deflected by the steam pressure from the inlet port. When these are intended for rolling contact, it is possible to form the seats in a similar way.

Manufacture of the lower seat from a spring plate makes further improvement in cushioning the cut-off movement possible. By manipulating the set-screw the lower spring seat may be adjusted to such a height that the spring plate in the closing movement, makes contact, first with the lower curved seat, but not with the inlet port. Before then being entirely cut off the steam pressure must overcome a doubled spring pressure, namely, that of the spring valve plate and of the lower curved seat, creating a specially noteworthy cushioning effect before the inlet port is touched.

I claim:

1. Inlet valve mechanism for engines comprising an inlet port, a spring cut-off valve arranged to normally open the inlet and to close the inlet by throttling the working vapor, and curved seats to limit the opening and closing movement of the spring.

2. Inlet valve mechanism for engines comprising an inlet port, a spring cut-off valve arranged to normally open the inlet and to close the inlet by throttling the working vapor, and curved spring seats to limit the opening and closing movement of the spring.

3. Inlet valve mechanism for engines comprising an inlet port, a spring cut-off valve arranged to normally open the inlet and to close the inlet by throttling the working vapor, curved spring seats to limit the opening and closing movement of the spring, and means for adjusting one of the seats.

4. Inlet valve mechanism for engines comprising an inlet port, a spring cut-off valve arranged to normally open the inlet and controlled by throttling the working vapor to close the inlet, curved spring seats to limit the opening and closing movement of the spring, and means for adjusting one of the seats to a position where it will engage the spring cut-off before it is forced to the seat of the inlet.

In testimony whereof I have hereunto set my hand.

KURT LIGNIEZ. [L. S.]